US 12,045,502 B1

(12) United States Patent
Arbel et al.

(10) Patent No.: US 12,045,502 B1
(45) Date of Patent: Jul. 23, 2024

(54) MEMORY CONTROLLER WITH REDUCED LATENCY TRANSACTION SCHEDULING

(71) Applicant: XILINX, INC., San Jose, CA (US)

(72) Inventors: Ygal Arbel, Morgan Hill, CA (US); Jonathan Jasper, San Jose, CA (US); Martin Newman, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/356,248

(22) Filed: Jun. 23, 2021

(51) Int. Cl.
  *G06F 3/06* (2006.01)
(52) U.S. Cl.
  CPC .......... *G06F 3/0659* (2013.01); *G06F 3/0604* (2013.01); *G06F 3/0673* (2013.01)
(58) Field of Classification Search
  CPC ..... G06F 3/0659; G06F 3/0604; G06F 3/0673
  See application file for complete search history.

(56) References Cited

U.S. PATENT DOCUMENTS

| | | | | |
|---|---|---|---|---|
| 2002/0163848 | A1* | 11/2002 | Grasso | G11C 7/1018 365/230.03 |
| 2003/0056034 | A1* | 3/2003 | Olds | G11B 19/02 710/5 |
| 2018/0356995 | A1* | 12/2018 | Fulkerson | G06F 3/0676 |
| 2021/0344610 | A1* | 11/2021 | Lesartre | H04L 47/621 |

OTHER PUBLICATIONS

Onur Mutlu, 15-740/18-740 Computer Architecture Lecture 25: Main Memory, Carnegie Mellon University shows available in 2013: https://www.youtube.com/watch?v=ZLCy3pG7Rc0 (Year: 2013).*

* cited by examiner

Primary Examiner — Charles Rones
Assistant Examiner — Alexander Vinnitsky
(74) Attorney, Agent, or Firm — Patterson + Sheridan, LLP

(57) ABSTRACT

A memory controller includes transaction queue circuitry, a first skip event, a second skip event, a third skip event, and scheduler circuitry. The transaction queue circuitry is configured to store a first transaction, a second transaction, and a third transaction. The first transaction received is by the transaction queue circuitry before the second transaction and the third transaction. The second transaction is received by the transaction queue circuitry before the third transaction. The first skip event counter is associated with the first transaction. The second skip event counter is associated with the second transaction. The third skip event counter is associated with the third transaction. The scheduler circuitry is configured to select the third transaction before selecting the first transaction, increase a value of the first skip event counter based on selecting the third transaction before the first transaction, and communicate the third transaction to a memory device.

22 Claims, 4 Drawing Sheets

MEMORY CONTROLLER WITH REDUCED LATENCY TRANSACTION SCHEDULING

TECHNICAL FIELD

Examples of the present disclosure generally relate to memory controllers and, in particular, to a memory controller with improved transaction scheduling.

BACKGROUND

Memory controllers control the communication between memory access clients (e.g., host devices) and a memory device or devices. For example, a memory controller includes a scheduler that selects transactions (e.g., read operations and write operations) from a queue of transactions to be provided to the memory device. The memory access clients issue transactions to a memory controller which are stored within a queue. The scheduler select transactions from the queue to maximize efficiency of the memory device. For example, the scheduler may reorder transactions such that transactions are selected in a different order than received to minimize overhead of the memory device. Overhead of the memory device is associated with access protocols and related timing parameters. However, the improved efficiency may also increase latency of the memory device. For example, due to the number and rate at which transactions associated with write operations are received, transactions associated with read operations may remain in the queue for an extended period of time, increasing the latency observed by a memory access client. The increased latency observed by the client device degrades the performance of the overall system.

In some instances, a memory controller groups transactions based on the associated read and write operations to control how often the memory device is switched between read and write operations and the efficiency of the memory device. Further, a memory controller may incorporate other mechanisms that prioritize transactions to be selected. However, the various mechanisms utilized by memory controllers to control the selection of transactions increases the complexity of the design of the memory controller and corresponding operation of the memory controller. Further, as the complexity of the memory controllers is increased, the difficulty in analyzing or predicting the performance of the memory controller is increased.

SUMMARY

A memory controller includes scheduler circuitry that controls the selection of transactions from a queue. Each of the transactions is associated with a skip event counter. The value of a skip event counter is incremented based on a skip event or events. As the memory controller receives transactions and populates the queue, the scheduler circuitry may select the transactions in an order different than from which the transactions were received. Selecting the transactions out of order may select a first transaction that was received after a second transaction. Accordingly, the value of the skip event counter associated with the second transaction is increased. Additionally, or alternatively, the value of a skip event counter may be increased based on the amount of time that the transaction has been stored within the transaction queue circuitry. In one example, when the queue is experiencing an under-subscribed scenario, transactions may remain in the transaction queue for extended periods of time. The values of the skip event counters are compared to a skip threshold and any transactions that are associated with a skip event counter having a value that satisfies the threshold are identified such that those transaction are selected before transactions that are associated with a skip event counter that does not satisfy the skip threshold are selected.

In one example, a memory controller comprises transaction queue circuitry, a first skip event, a second skip event, a third skip event, and scheduler circuitry. The transaction queue circuitry is configured to store a first transaction, a second transaction, and a third transaction. The first transaction received is by the transaction queue circuitry before the second transaction and the third transaction. The second transaction is received by the transaction queue circuitry before the third transaction. The first skip event counter is associated with the first transaction. The second skip event counter is associated with the second transaction. The third skip event counter is associated with the third transaction. The scheduler circuitry is configured to select the third transaction before selecting the first transaction, increase a value of the first skip event counter based on selecting the third transaction before the first transaction, and communicate the third transaction to a memory device.

In one example, a method for selecting transactions comprises selecting a third transaction from transaction queue circuitry before selecting a first transaction from the transaction queue circuitry. The transaction queue circuitry receives the first transaction before a second transaction and the second transaction before the third transaction. The first transaction is associated with a first skip event counter, the second transaction is associated with a second skip event counter, and the third transaction is associated with a third skip event counter. The method further comprises detecting a skip event based on selecting the third transaction before the first transaction, and increasing a value of the first skip event counter based on the detection of the skip event. Further, the method comprises communicating the third transaction to a memory device.

In one example, a computer system comprises a memory device and memory controller. The memory controller comprises transaction queue circuitry, a first, second and third skip event counter, scheduler circuitry, and control circuitry. The transaction queue circuitry is configured to store a first transaction, a second transaction, and a third transaction. The first transaction is received before the second transaction and the second transaction is received before the third transaction. The first skip event counter is associated with the first transaction, the second skip event counter is associated with the second transaction, and the third skip event counter is associated with the third transaction. The scheduler circuitry is configured to select the third transaction before selecting the first transaction. A value of the first skip event counter is increased based on selecting the third transaction before the first transaction. The control circuitry is configured to communicate the third transaction to the memory device.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Memory controllers include various mechanisms for controlling which transactions of a queue are selected and provided to a memory device. In one example, a memory controller includes scheduler circuitry that controls the selection of transactions from a transaction queue circuitry based on a skip event counter value of the transactions. During operation, the skip event counter value is increased based on a skip event. A skip event may correspond to selecting transactions in an order different from which the transaction were received and/or transactions remaining in the transaction queue circuitry for an amount of time greater than a threshold amount of time. The skip event counter values are compared to a skip threshold. The transactions associated with skip event counter values that satisfy the skip threshold are identified such that those transactions are selected before transactions that are not associated with skip event counter values that satisfy the skip threshold.

In various examples, a memory controller that includes scheduler circuitry and tracks skip events via skip event counters is able to account for various different events that may affect one or more of the efficiency and latency of a corresponding memory device with a less complex design as compared to other memory controllers. Accordingly, such memory controllers have a lower design and manufacturing cost as compared to other memory controllers. Further, memory controllers that include scheduler circuitry and skip event thresholds are able to increase the efficiency of memory devices without negatively affecting the latency of the memory devices.

Figure 1:
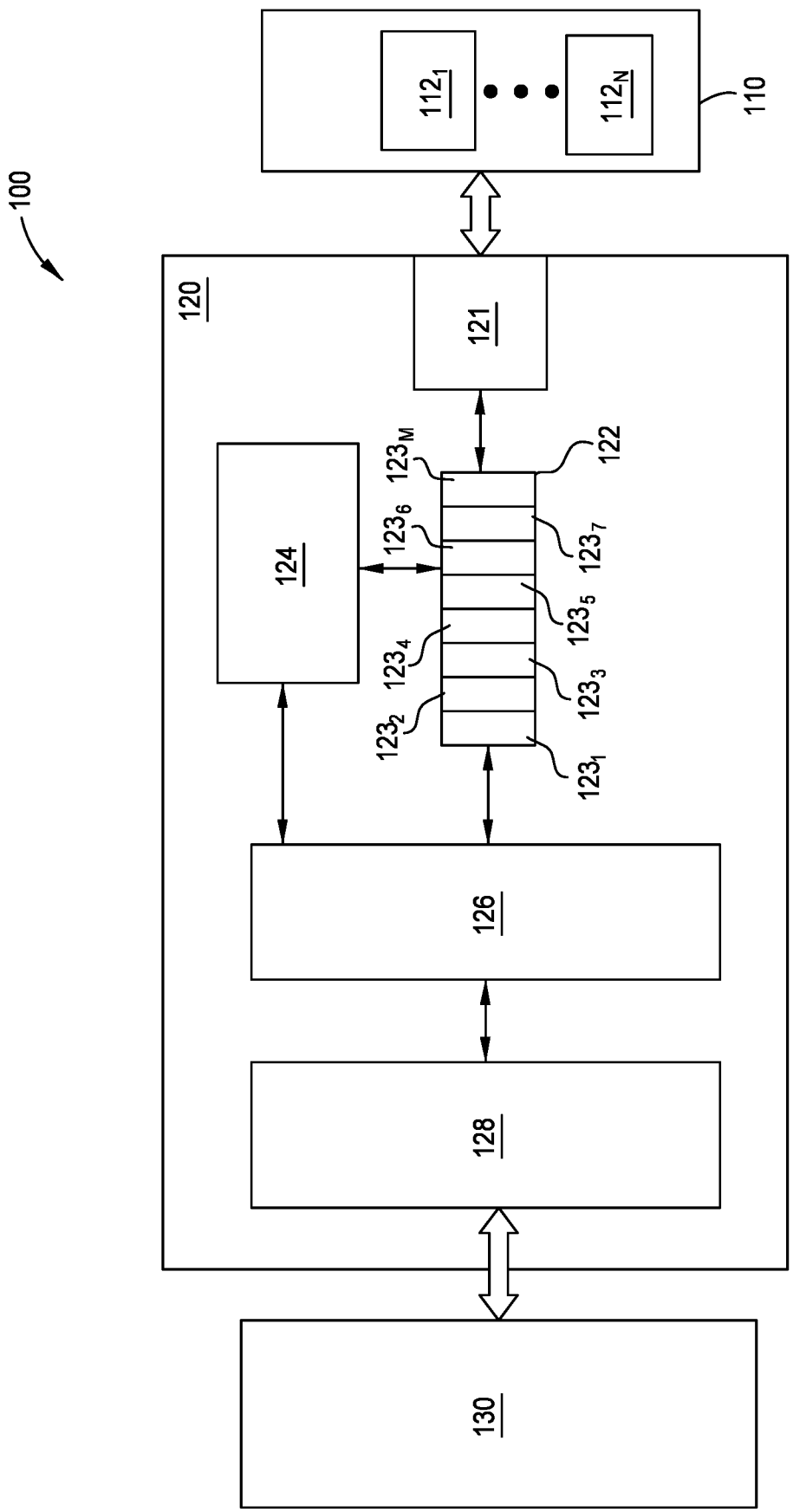
FIG. 1 is a block diagram depicting a computer system, according to one or more examples.

FIG. 1 illustrates a computer system 100, according to one or more examples. The computer system 100 includes host system 110, memory controller 120, and memory device 130.

The host system 110 includes one or more data processing systems. For example, the host system 110 includes one or more computers or server devices. In one example, the host system 110 includes one or more processors, one or more memory devices, and one or more input/output (I/O) devices. In one example, the host system 110 includes one or more memory access clients 112. For example, the host system 110 includes memory access clients $112_1$, $112_2$-$112_N$, where N is two or more. In one example, the host system 110 includes a single memory access client 112.

Each memory access client 112 communicates transactions (or commands) to the memory controller 120. Further, each memory access client 112 is a processing system such as a computer or server device. The transactions include read operations and write operations.

The host system 110 is communicatively connected to the memory controller 120. The memory controller 120 receives transactions from the host system 110 and communicates transactions to the memory device 130. The memory controller 120 is an integrated circuit (IC). In one example, the memory controller 120 is a field programmable gate array (FPGA). In other examples, the memory controller 120 is an application specific IC (ASIC).

The memory controller 120 includes interface circuitry 121, transaction queue circuitry 122, skip event counter circuitry 124, scheduler circuitry 126, and control circuitry 128.

The interface circuitry 121 receives data from the host system 110 and transmits data to the host system 110. For example, the interface circuitry 121 receives transactions from the memory access clients 112 of the host system 110. The transactions include read operations and write operations. The interface circuitry 121 communicates the transactions to the transaction queue circuitry 122. The transaction queue circuitry 122 stores the transactions received from the memory access clients 112. The transaction queue circuitry 122 includes a plurality of transaction slots 123. The plurality of transaction slots 123 includes transaction slot $123_1$-$123_M$, where M is two or more. Each of the transaction slots 123 stores an entry associated with a transaction received from the host system 110. For example, each transaction slot 123 stores a read operation or a write operation received from the memory access client 112.

The skip event counter circuitry 124 is communicatively connected to the transaction queue circuitry 122. In one example, the skip event counter circuitry 124 is part of the transaction queue circuitry 122. The skip event counter circuitry 124 includes a skip event counter for each transaction stored in the transaction queue circuitry 122. Further, the skip event counter circuitry 124 includes a counter for each transaction slot 123 in the transaction queue circuitry 122. In one example, each transaction slot 123 includes a skip event counter. The skip event counter circuitry 124 increases the value of each skip event counter based on a detected skip event.

The transaction queue circuitry 122 and the skip event counter circuitry 124 are communicatively connected to the scheduler circuitry 126. The scheduler circuitry 126 selects the transactions within the transaction queue circuitry 122 to be provided to the memory device 130. The scheduler circuitry 126 selects a transaction from the transaction queue circuitry 122 that minimizes overhead within the memory device 130. Stated another way, the scheduler circuitry 126 selects a transaction from the transaction queue circuitry 122 that may be executed more quickly than the other transactions within the transaction queue circuitry 122. In one example, the scheduler circuitry 126 selects a transaction from the transaction queue circuitry 122 based on a previously selected transaction. For example, the scheduler circuitry 126 selects a transaction based on the operation type associated with a last selected transaction, a target memory rank of a last selected transaction, and/or a target memory bank of a last selected transaction, among others. In one example, if a previous transaction was associated with a read operation, the scheduler circuitry 126 selects a transaction that is associated with a read operation. Additionally, the scheduler circuitry 126 selects transactions based on a value of the corresponding skip event counters.

The scheduler circuitry 126 is communicatively connected to the control circuitry 128. The scheduler circuitry 126 communicates selected transactions to the control circuitry 128. The control circuitry 128 includes one or more of address mapping circuitry, command execution circuitry, and interface circuitry. In one example, the control circuitry 128 communicates selected transactions received from the transaction queue circuitry 122 to the memory device 130.

The memory device 130 may be a random access memory (RAM) device. In one example, the memory device 130 is a dynamic RAM device. The memory device 130 is an array organized as memory ranks, memory banks, a plurality of rows, and a plurality of columns. For example, a memory rank corresponds to two or more memory chips connected together. A memory bank is a two dimensional array of rows and columns. The memory device 130 completes an operation associated with the selected transaction received from the control circuitry 128 and provides a corresponding response. For example, the memory device 130 writes data into a row and column of a memory bank based on a write operation and reads data from a row and column of a memory bank based on a read operation. In one example, the memory device 130 outputs a write complete notification in response to a completed write operation or requested data in response to a read operation.

Figure 2:
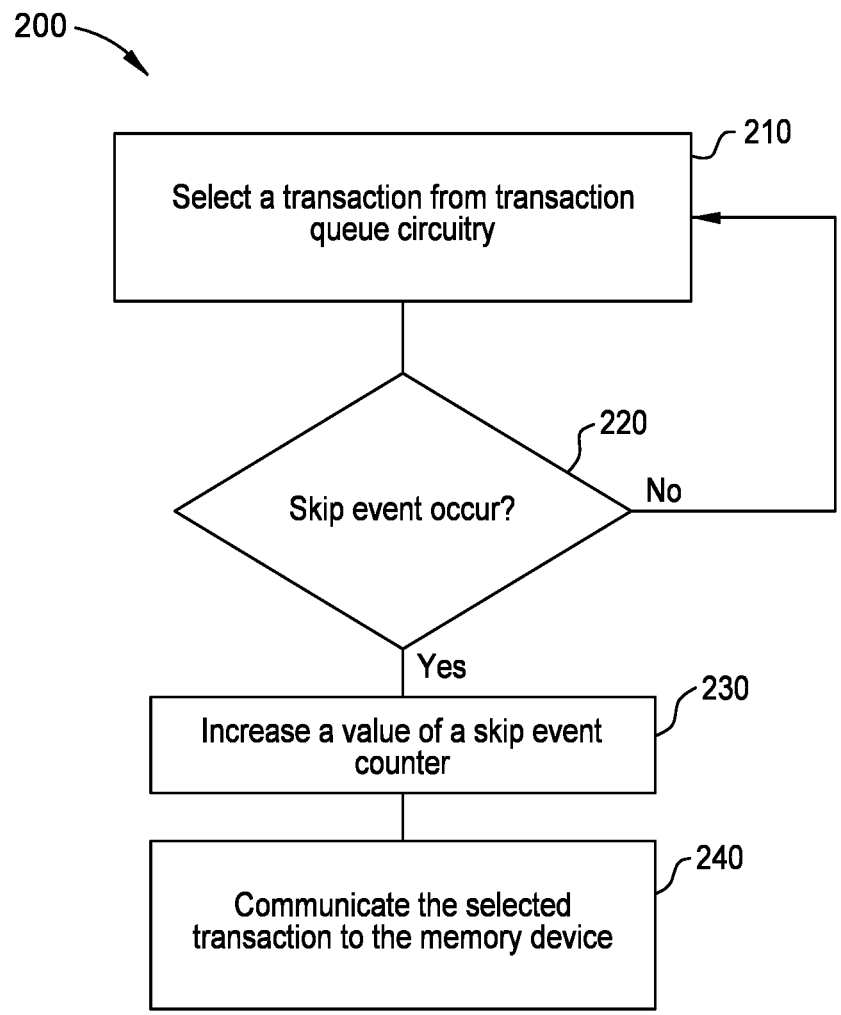
FIG. 2 illustrates a flow chart of a method for selecting transactions, according to one or more examples.

The scheduler circuitry 126 reorders the transactions within the transaction queue circuitry 122 to increase the efficiency of the memory device 130 and/or mitigate latency observed by a memory access client 112. For example, the scheduler circuitry 126 reorders the transactions to avoid inefficient operations. In one example, an inefficient operation corresponds to two read operations targeting different rows in a common bank of the memory device 130. If these two read operations were executed sequentially, a page-miss overhead may occur during which at least a portion of the memory device 130 is not usable for a period of time. In one example, the scheduler circuitry 126 selects transactions that refer to a same row within the memory bank to mitigate page miss overhead. The scheduler circuitry 126 selects transactions that are associated with a common type of command (e.g., read commands or write commands) to avoid bus turnaround timing penalty. Additionally, or alternatively, the scheduler circuitry 126 selects transactions that refer to a same rank to avoid rank switching overhead. Further, to avoid latency issues that may occur when a transaction is not selected for an extended period of time, the scheduler circuitry 126 selects a transaction when the value of an associated skip event counter satisfies a skip threshold. For example, FIG. 2 illustrates flowchart of a method 200 for selecting transactions with an improved latency, according to one or more examples.

The method 200 is executed by the computer system 100. At block 210 of the method 200, a transaction is selected from a transaction queue during a selection period. The selection period may correspond to a pulse of a clock signal. For example, the scheduler circuitry 126 selects a transaction from the transaction queue circuitry 122 and communicates the command associated with the selected transaction to the memory device 118 via the control circuitry 128. The scheduler circuitry 126 may select a transaction that is associated with an operation type of that of the last selected transaction, or a transaction having a target memory rank, memory bank, memory column, and/or memory row as that of the last selected transaction.

At block 220 of the method 200 a determination as to whether or not a skip event occurred is made. The scheduler circuitry 126 determines whether or not a skip event occurred. In one example, a skip event is determined to have occurred when the selected transaction was received by the transaction queue circuitry 122 after an unselected transaction. For example, the scheduler circuitry 126 determines if one or more of the unselected transactions have been in the transaction queue circuitry 122 for a period greater than the period for which the selected transaction was in the transaction queue circuitry 122. A skip event is determined when an unselected transaction is determined to have been stored within the transaction queue for a longer amount of time than the selected transaction.

In another example, a skip event is determined to have occurred when the amount of time for which a transaction remained in the transaction queue circuitry 122 exceeds a threshold amount of time. For example, the scheduler circuitry 126 may determine that a skip event occurred based on a transaction being within the transaction queue circuitry 122 for a period of time greater than the threshold amount of time. The threshold amount of time may be T clock cycles, where T is greater than one.

In one example, a skip event is determined to have occurred when transaction queue circuitry 122 receives a transaction action associated with a selection parameter but only includes transaction associated with a second selection parameter, and the last selected transaction is associated with the first selection parameter. For example, the transaction queue circuitry 122 receives transactions associated with a read operation at about the same rate as transactions associated with a read operation are selected from the transaction queue circuitry 122. As a transaction is selected as it is received, it may never be stored within the transaction queue circuitry 122.

An unselected transaction for which a skip event has occurred may be referred to as a skipped transaction. After selecting a transaction during a selection period, one or more unselected transaction may be identified as a skipped transaction.

At block 230 of the method 200, based on the determination that a skip event occurred, a skip event counter is increased based on a determination that a skip event occurred. For example, the scheduler circuitry 126 instructs the skip event counter circuitry 124 to increase a value of a skip event counter associated for each skipped transaction. The value of the skip event counter associated with a skipped transaction is increased.

If at block 220 of the method 200, the skip event is determined to not have occurred, another transaction is selected at block 210 of the method 200.

At block 240 of the method 200, the selected transaction is communicated to the memory device. For example, the scheduler circuitry 126 communicates the selected transaction to the memory device 130 via the control circuitry 128. In various embodiments, block 240 of the method 200 may occur before, after, or in parallel with block 220 or block 230 of the method 200.

Figure 3:
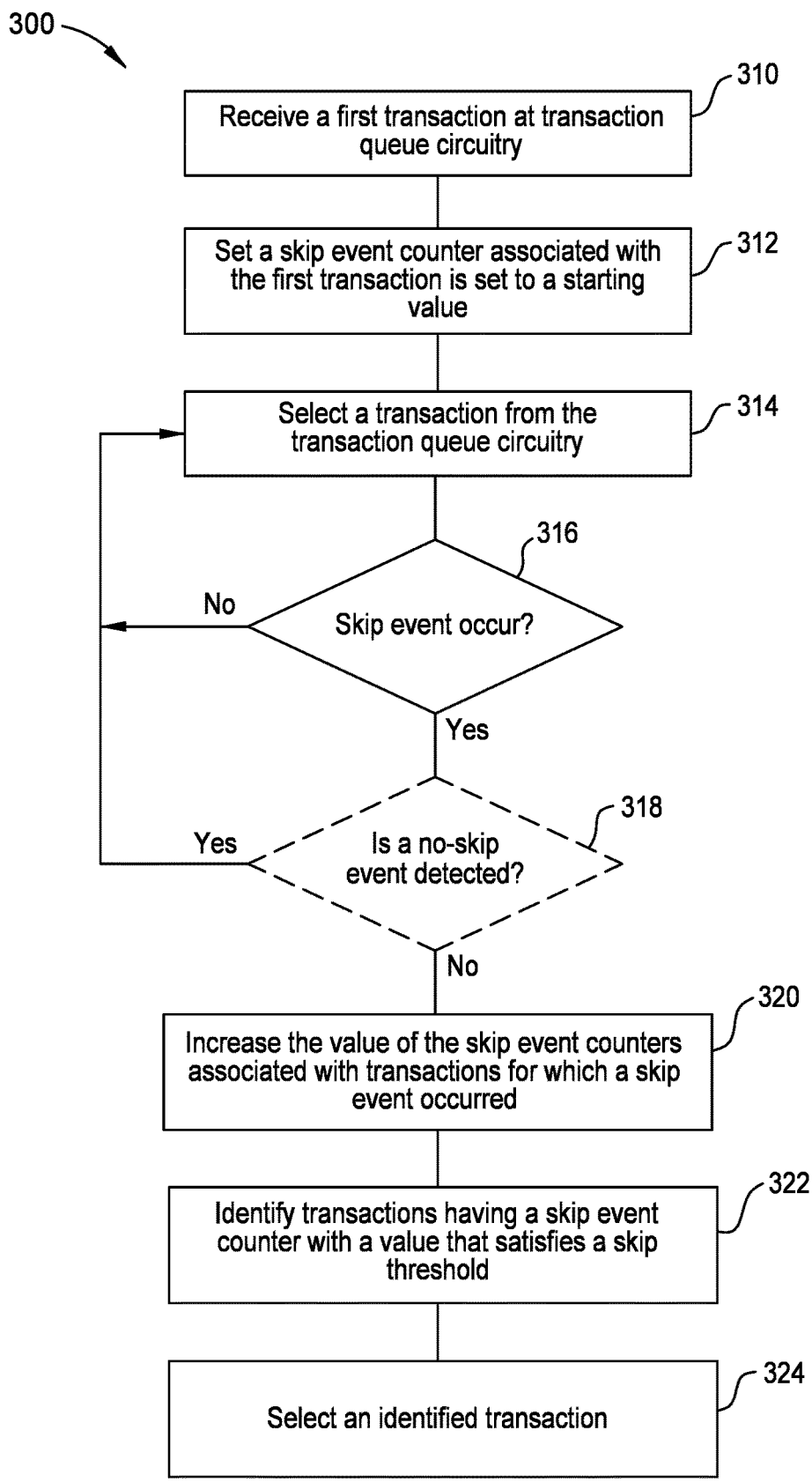
FIG. 3 illustrates a flow chart of a method for selecting transactions, according to one or more examples.

FIG. 3 illustrates a flow chart of a method 300 for selecting transactions from a memory queue, according to one or more examples. At block 310, a first transaction is received at a transaction queue. For example, with reference to FIG. 1, a transaction is received by the memory controller 120 from the host system 110 via the interface circuitry 121. The interface circuitry 121 provides (communicates) the first transaction to a transaction slot 123 within the transaction queue circuitry 122. In one example, the transactions are stored within the transaction queue circuitry 122 based on a first-in-first-out (FIFO) structure. In such a structure, the position of a transaction within the transaction queue circuitry 122 corresponds to the age of the transaction. The age of a transaction corresponds to the amount of time that the transaction has been in the transaction queue circuitry 122. In one example, the transactions are stored within the transaction slots $123_1$-$123_N$. In such an example, the age of transactions decrease from transaction slot $123_1$ to $123_N$, with older transactions being stored in transaction slots closer to transaction slot $123_1$ and younger transactions being stored in transaction slots closer to transaction slot $123_N$. Older transactions have been in the transaction queue for an amount of time longer than younger transactions.

In one example, a time stamp is applied to the first transaction when it is received and stored within the transaction queue circuitry 122. The time stamp may be used to determine the amount of time the first transaction has been stored within the transaction queue circuitry 122. Further, in such an example, a time stamp is associated with each transaction as it is received and stored within transaction queue circuitry 122. Accordingly, the amount of time (e.g., age) that each transaction has been stored in the transaction queue circuitry 122 may be determined. The transaction queue circuitry 122 may apply the time stamp to each of the transaction received and stored within the transaction queue circuitry 122. In another example, the time stamp is applied to each transaction in the transaction queue circuitry 122 by the scheduler circuitry 126 or the skip event counter circuitry 124. In such an embodiment, the scheduler circuitry 126 or the skip event counter circuitry 124 maintains the time stamp for each transaction.

At block 312 of the method 300, the value of the skip event counter associated with the first transaction is set to a starting value (e.g., a value of zero or some initial value greater than zero). In one example, the skip event counter is part of the skip event counter circuitry 124 and the skip event counter circuitry 124 sets the value of the skip event counter associated with the first transaction to the starting value based on the first transaction being received at the transaction queue circuitry 122. The transaction queue circuitry 122 may provide a control signal to the skip event counter circuitry 124 indicating that the first transaction has been received, and the skip event counter circuitry 124 sets the value of the corresponding skip event counter to the starting value based on receiving the control signal. In another example, the scheduler circuitry 126 sets the value of the skip event counter associated with the first transaction to the starting value based on the first transaction being received at the transaction queue circuitry 122. The transaction queue circuitry 122 may provide a control signal to the scheduler circuitry 126 indicating that the first transaction has been received and the scheduler circuitry 126 instructs the skip event counter circuitry 124 to sets the value of the corresponding skip event counter to the starting value.

At block 314 of the method 300, a transaction is selected from the transaction queue. For example, the scheduler circuitry 126 selects a transaction from the transaction queue. The scheduler circuitry 126 may select a transaction from the transaction queue circuitry 122 in a different order than the transactions were received. In one example, the scheduler circuitry 126 periodically selects transactions from the transaction queue during a plurality of selection periods. For example, each selection period may corresponds to a rising or falling edge of a transition of a clock signal. The clock signal may be internally generated by the memory controller 120 or generated external to the memory controller 120 and communicated to the memory controller 120.

The scheduler circuitry 126 selects a transaction having at least one selection parameter in common with a previously selected transaction. In one example, the scheduler circuitry 126 selects a transaction associated with a similar command type than that of a previously selected transaction. For example, if a previously selected transaction is associated with a read command, the scheduler circuitry 126 selects a transaction associated with a read command. Additionally, or alternatively, the scheduler circuitry 126 selects a transaction targeting the same row, column, rank, and/or bank of the memory device 130 as that of a previously selected transaction.

At block 316 of the method 300, a determination as to whether or not a skip event occurred is made. For example, the scheduler circuitry 126 determines whether or not a skip event has occurred for one or more transactions within the transaction queue circuitry 122. In one example, a skip event is determined to have occurred when a younger (or newer) transaction is selected from the transaction queue circuitry 122 before an older transaction in the transaction queue circuitry 122. For example, when the scheduler circuitry 126 select a transaction that was received at time T before selecting a transaction received at time T-1, a skip event is determined to have occurred.

Additionally, or alternatively, a skip event is determined to have occurred based on an amount of time a transaction has been stored within the transaction queue circuitry 122. For example, a skip event may additionally, or alternatively, be determined based on the amount of time a transaction is stored within the transaction queue circuitry 122 satisfying (e.g., meeting and/or exceeding) a threshold amount of time. In one example, the last selected transaction is associated with a first selection parameter, and the transaction queue circuitry 122 receives transactions associated with the first selection parameter. However, the transaction queue circuitry 122 only includes transactions associated with a second selection parameter. In such an example, the scheduler circuitry 126 may continue to select the transactions associated with the first parameter as they are received by the transaction queue circuitry 122 to minimize overhead within the corresponding memory device. However, the transactions within the transaction queue circuitry 122 are not selected (e.g., serviced). To ensure that the observed latency of the transactions within the transaction queue circuitry 122 is mitigated, the amount of time that the transactions are stored within the transaction queue circuitry 122 is monitored. Based on the amount of time satisfying a threshold amount of time, a skip event is determined.

An unselected transaction for which a skip event has occurred may be referred to as a skipped transaction. After selecting a transaction during a selection period, one or more unselected transaction may be identified as a skipped transaction.

If no skip events are determined to have occurred at block 316 of the method 300, the method 300 proceeds to block 314 of the method 300 where another transaction is selected from the transaction queue circuitry 122.

If a skip event is determined to have occurred at block 316 of the method 300, the method 300 proceeds to block 318 of the method 300. At block 318 of the method 300, a determination as to whether or not a no skip event has occurred is determined. For example, the scheduler circuitry 126 determines whether or not a no skip event has occurred. A no skip event may correspond to a refresh of the memory device 130. The memory controller 120 issues refresh events to the memory device 130 at regular intervals. During a refresh, the memory device 130 is not available and execution of read and write operations is suspended. In one example, all the banks of the memory device 130 are refreshed. In such an example, in configurations were the memory device 130 includes multiple ranks, each rank is refreshed one at a time. Accordingly, the scheduler circuitry 126 pauses the selection of transactions as the memory device 130 is unable to execute operations. In another example, the refresh includes refreshing only a portion of the ranks of the memory device 130 at a time. Accordingly, transactions associated with the ranks that are not being refreshed may be selected and corresponding commands may be executed. In another example, a single bank of the memory device 130 is refreshed.

Based on the detection of a no skip event, the skip event counters associated with transactions corresponding to the no skip event (e.g., the transactions that are not selectable due to a refresh or other no skip event) are not updated. In one example, if a no skip event is detected at block 320, the method 300 proceeds to block 314 of the method 300 and another transaction is selected by the selection circuitry.

In various examples, block 318 of the method 300 is optional and may be omitted from the method 300. Further, block 318 of the method 300 may occur before block 314 or before block 316 of the method 300. In one example, block 318 of the method 300 occurs after block 320 of the method 300.

If at block 318 of the method 300 a no skip event is detected and if at block 316 of the method 300 a skip event is detected, the method 300 proceeds to block 320 of the method 300. At block 320 of the method 300, the value of one or more skip event counters is increased. The value of the skip event counters associated with transactions for which a skip event occurred is increased. In one example, a skip event is determined to have occurred when a selected transaction was received by the transaction queue circuitry 122 after a non-selected transaction was received by the transaction queue circuitry 122. Further, a skip event is determined to have occurred when an amount of time that a transaction is in the transaction queue circuitry satisfies a threshold amount time.

The skip event counter circuitry 124 increases the value of the skip event counter of each transaction for which a skip event occurred. These transactions may be referred to as skipped transactions. In one example the skip event counter circuitry 124 identifies each skipped transaction and updates the corresponding skip event counters. The skip event counter circuitry 124 may receive a control signal from the scheduler circuitry 126 or the transaction queue circuitry 122 indicating the selected transaction. The skip event counter circuitry 124 identifies the skipped transactions based on the indication of the selected transaction and the age information and/or time stamp of the unselected transactions. For example, the skip event counter circuitry 124 compares the time stamp of each unselected transaction with the time stamp of the selected transaction to determine if an unselected transaction was received before the selected transaction and is a skipped transaction. Further, the skip event counter circuitry 124 compares an amount of time that an unselected transaction has been stored in the transaction queue circuitry 122 to a threshold amount of time to determine if the unselected transaction has been in the transaction queue circuitry 122 for a period of time that satisfies the threshold amount of time. In one example, the scheduler circuitry 126 identifies each skipped transaction (e.g., a transaction associated with a skip event) as described above and instructs the skip event counter circuitry 124 to update the value of the corresponding skip event counters. Further, scheduler circuitry 126 identifies each skipped transaction as described above and updates the value of the corresponding skip event counters within the skip event counter circuitry 124.

In one example, transactions are selected during a selection period (e.g., a clock cycle). During a selection period skip event and/or no skip events may be detected as described above. Based on the detection of a skip event, the values of the skip event counters associated with the transactions that are affected the skip events are updated. Accordingly, the values of the skip event counters may be updated once during each selection period.

At block 322 of the method 300, each transaction having a skip event counter that satisfies a skip threshold is identified. For example, the value of the skip event counter of each transaction is compared to the skip threshold. A transaction having a skip event counter with a value that exceeds or meets and exceeds the value of the skip threshold is identified as satisfying the skip threshold. In one example, the scheduler circuitry 126 performs the comparison between the values of the skip event counters and the skip threshold. In another example, the skip event counter circuitry 124 performs the comparison the values of the skip event counters and the skip threshold. The identified transactions are flagged or identified in some other way such that the scheduler circuitry 126 is able to detect the identified transactions. An identified transaction may be referred to as a no skip transaction.

At block 324 of the method 300, an identified transaction during block 322 of the method 300 is selected for execution. For example, the scheduler circuitry 126 selects the identified transaction for execution. In one example, block 322 of the method 300 may occur before the scheduler circuitry 126 selects a transaction for execution. For example, block 322 of the method 300 may additionally occur before block 310 of the method 300. The scheduler circuitry 126 transmits the operation corresponding to the selected transaction to the memory device 130 via the control circuitry 128.

In one example, two or more transactions are determined to have a skip count with a value that satisfies the skip threshold. These transactions may be referred to as no-skip transactions as these transactions are to be selected by the scheduler circuitry 126 before transactions having skip counter values that do not satisfy the skip threshold. The scheduler circuitry 126 may group or order the no-skip transactions based on the associated command type, a target rank within the memory device 130, and/or a target bank within the memory device 130.

In one example, blocks 316-318 of the method 300 are omitted and at block 320 block the skip event counters for all non-selected transactions are updated. In such an example, the skip threshold may be set to a higher value than the skip threshold of method 300 as described above.

The skip threshold may be programmable (e.g., adjustable). For example, the scheduler circuitry 126 or the skip event counter circuitry 124 may alter the skip threshold. In one example, the skip threshold is adjusted based on traffic pattern statistics.

Figure 4:
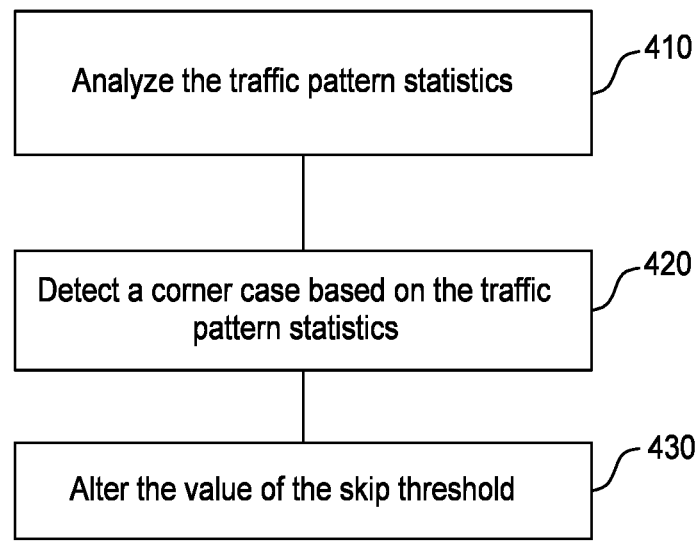
FIG. 4 illustrates a flow chart of a method for updating a skip threshold, according to one or more examples.

FIG. 4 illustrates a flow chart of a method 400 for updating a skip threshold, according to one or more examples. At block 410 of the method 400, traffic pattern statistics between the memory controller 120 and the memory device 130 are determined. For example, the scheduler circuitry 126 determines the traffic pattern statistics. The scheduler circuitry 126 analyzes the transactions provided by the host system 110, the selected transactions, and the transactions within the transaction queue circuitry 122 to determine the frequency or rate at which transactions of associated with different selection parameters are received by the transaction queue circuitry 122 and selected by the scheduler circuitry 126.

At block 420 of the method 400, a corner case is detected based on the traffic pattern statistics. For example, the scheduler circuitry 126 determines a corner case based on the traffic pattern statistics. In one example, the scheduler circuitry 126 determines an under-subscribed corner case based on a determination that one or more transactions associated with a first operation type are stored within the transaction queue circuitry 122, no transactions associated with a second operation type are stored within the transaction queue circuitry 122, and the rate at which transactions associated with the second operation type are received by the transaction queue circuitry 122 is less than a threshold rate. The threshold rate may be one or more clock signals. An under-subscribed corner case is determined when the rate at which transactions are selected by the scheduler circuitry 126 is greater than the rate at which transactions are received by the transaction queue. In other examples, other selection parameters may be used to determine a corner case in addition to, or alternatively to, operation type as is described above.

At block 430 of the method 400, the value of the skip threshold is altered. For example, the scheduler circuitry 126 increases or decreases the value of the skip threshold based on the detected corner case. The scheduler circuitry 126 decreases the value of the skip threshold based on the detection of an under-subscribed corner case.

In one example, the scheduler circuitry 126 detects that the transaction queue circuitry 122 is over-subscribed and increases the value of the skip threshold. When in an over-subscribed scenario, the transaction queue circuitry 122 is full and is receiving transactions at a rate about equal to the rate at which transactions are selected.

As is described above, a memory controllers includes scheduler circuitry that controls the selection of transactions from a transaction queue based on a skip event counter value of the transactions. The skip event counter value associated with a skipped transaction is increased based on the detection of a skip event. The skip event counter values are compared to a skip threshold. The transactions associated with skip event counter values that satisfy the skip threshold are identified such that those transactions are selected before transactions that are not associated with skip event counter values that satisfy the skip threshold. Accordingly, the amount of time that a transaction remains in a transaction queue may be monitored and controlled to reduce latency of the corresponding memory device. Further, such a methods allows for adjusting the trade-off between latency and efficiency by adjusting the value of the skip threshold. For example, increasing the value of the skip threshold increases the increases the efficiency while negatively affecting the latency, and decreasing the value of the skip threshold decreases the latency by negatively affecting the efficiency.

While the foregoing is directed to specific examples, other and further examples may be devised without departing from the basic scope thereof, and the scope thereof is determined by the claims that follow.

What is claimed is:

1. A memory controller comprising:
a transaction queue circuitry configured to store a first transaction, a second transaction, and a third transaction, wherein the first transaction is received by the transaction queue circuitry before the second transaction and the third transaction, and the second transaction is received by the transaction queue circuitry before the third transaction;
a first skip event counter associated with the first transaction;
a second skip event counter associated with the second transaction;
a third skip event counter associated with the third transaction; and
scheduler circuitry configured to:
select the third transaction before selecting the first transaction based on the third transaction being quicker to execute than the first transaction determined based on a transaction type of a previously selected transaction, a transaction type and a location of a memory bank and a memory rank of the third transaction, and a transaction type and a location of a memory bank and a memory rank of the first transaction, wherein the previously selected transaction is a transaction selected by the scheduler circuitry before the third transaction;
increase a value of the first skip event counter based on selecting the third transaction before the first transaction; and
communicate the third transaction to a memory device.

2. The memory controller of claim 1, wherein the scheduler circuitry is further configured to:
compare the value of the first skip event counter to a skip threshold; and
select the first transaction based on the value of the first skip event counter satisfying the skip threshold.

3. The memory controller of claim 2, wherein selecting the third transaction before the first transaction further includes selecting the third transaction before the second transaction.

4. The memory controller of claim 3, wherein the scheduler circuitry is further configured to:
increase a value of the second skip event counter based on selecting the third transaction before the second transaction; and
compare the value of the second skip event counter to the skip threshold.

5. The memory controller of claim 2, wherein the scheduler circuitry is further configured to:
select the first transaction before the second transaction based on the value of the first skip event counter satisfying the skip threshold.

6. The memory controller of claim 2, wherein the scheduler circuitry is further configured to adjust the skip threshold.

7. The memory controller of claim 6, wherein the scheduler circuitry is further configured to:
adjust the skip threshold based on a rate at which transactions are received by the transaction queue circuitry.

8. The memory controller of claim 1, wherein the scheduler circuitry is further configured to increase the first skip event counter based on the first transaction being stored within the transaction queue circuitry for an amount of time satisfying a time threshold.

9. The memory controller of claim 1, wherein the memory controller is configured to refresh memory banks and memory ranks individually and the scheduler circuitry pauses selection of transactions in a memory rank or memory bank during the refresh of a respective memory bank or memory rank.

10. The memory controller of claim 9, wherein the first skip event counter, the second skip event counter, and/or the third skip event counter do not increase when the respective memory bank or memory rank is refreshed.

11. A method for selecting transactions, the method comprising:

selecting a third transaction from a transaction queue circuitry before selecting a first transaction from the transaction queue based on the third transaction being quicker to execute than the first transaction determined based on a transaction type of a previously selected transaction, a transaction type and a location of a memory bank and a memory rank of the third transaction, and a transaction type and a location of a memory bank and a memory rank of the first transaction, wherein the previously selected transaction is a transaction selected by scheduler circuitry before the third transaction, wherein the transaction queue circuitry receives the first transaction before a second transaction and the second transaction before the third transaction, and wherein the first transaction is associated with a first skip event counter, the second transaction is associated with a second skip event counter, and the third transaction is associated with a third skip event counter;

detecting a skip event based on selecting the third transaction before the first transaction;

increasing a value of the first skip event counter based on the detection of the skip event; and communicating the third transaction to a memory device.

12. The method of claim 11 further comprising:

comparing the value of the first skip event counter to a skip threshold; and selecting the first transaction based on the value of the first skip event counter satisfying the skip threshold.

13. The method of claim 12 further comprising increasing a value of the second skip event counter based on selecting the third transaction.

14. The method of claim 12, wherein the first transaction is selected before the second transaction based on the value of the first skip event counter satisfying the skip threshold.

15. The method of claim 12 further comprises adjusting the skip threshold.

16. The method of claim 15 wherein adjusting the skip threshold comprises:

adjusting the skip threshold based on a rate at which transactions are received by the transaction queue circuitry.

17. The method of claim 11, wherein the skip event is determined based on detecting that the first transaction has been stored within the transaction queue circuitry for an amount of time that satisfies a time threshold.

18. A computer system comprising:

a memory device; and a memory controller comprising:

a transaction queue circuitry configured to store a first transaction, a second transaction, and a third transaction, wherein the first transaction is received before the second transaction and the second transaction is received before the third transaction;

a first skip event counter associated with the first transaction, a second skip event counter associated with the second transaction, and a third skip event counter associated with the third transaction;

scheduler circuitry configured to select the third transaction before selecting the first transaction based on the third transaction being quicker to execute than the first transaction determined based on a transaction type of a previously selected transaction, a transaction type and a location of a memory bank and a memory rank of the third transaction, and a transaction type and a location of a memory bank and a memory rank of the first transaction, wherein the previously selected transaction is a transaction selected by the scheduler circuitry before the third transaction, and wherein a value of the first skip event counter is increased based on selecting the third transaction before the first transaction; and control circuitry configured to communicate the third transaction to the memory device.

19. The computer system of claim 18, wherein the scheduler circuitry is further configured to:

compare the value of the first skip event counter to a skip threshold; and select the first transaction based on the value of the first skip event counter satisfying the skip threshold.

20. The computer system of claim 19, wherein selecting the third transaction before the first transaction further includes selecting the third transaction before the second transaction, and wherein the scheduler circuitry is further configured to:

increase a value of the second skip event counter based on selecting the third transaction before the second transaction; and compare the value of the second skip event counter to the skip threshold.

21. The computer system of claim 19, wherein the scheduler circuitry is further configured to select the first transaction before the second transaction based on the value of the first skip event counter satisfying the skip threshold.

22. The computer system of claim 19, wherein the scheduler circuitry is further configured to adjust the skip threshold based on a rate at which transactions are received by the transaction queue circuitry.

* * * * *